July 24, 1962 — H. E. RAPP — 3,045,709
PROTECTIVE CASING FOR PIPES AND THE LIKE
Filed Jan. 21, 1959
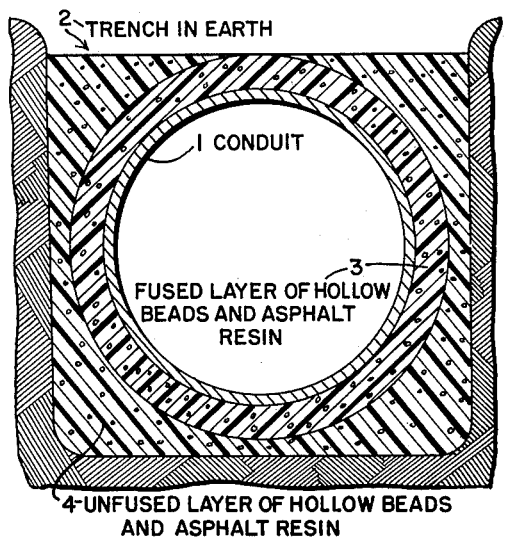
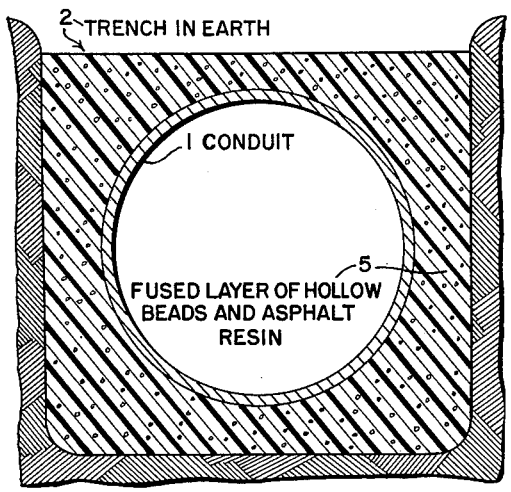
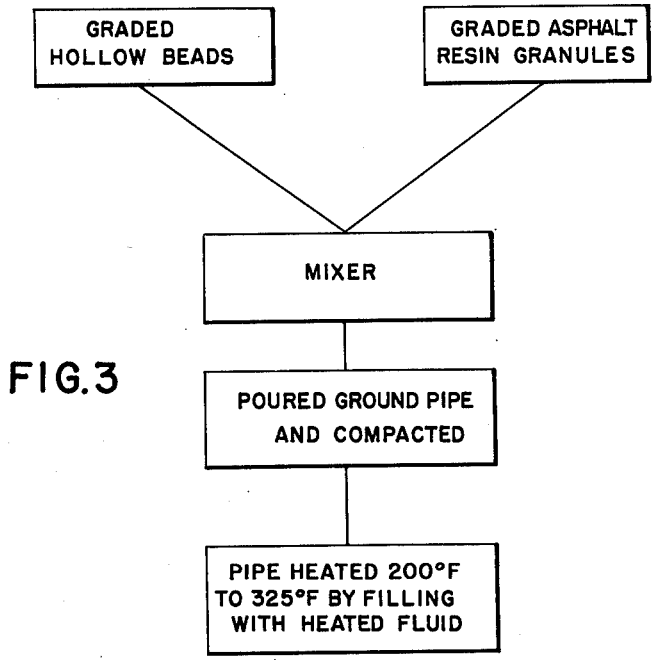
INVENTOR
HARRY E. RAPP
BY *Lester Mueller*
ATTORNEY 3,045,709
PROTECTIVE CASING FOR PIPES AND THE LIKE
Harry E. Rapp, Bryn Mawr, Pa., assignor to Insul-Fil Co., Inc., Long Island, N.Y., a corporation of New Jersey
Filed Jan. 21, 1959, Ser. No. 788,061
10 Claims. (Cl. 138—145)

This invention relates to a protective casing for pipes, conduits, tanks, processing equipment and the like, its object being to provide an improved heat and corrosion resistant barrier between such a structure and its environment.

Another object is to permit such a casing to be either pre-cast, or to be cast in place and securely bonded to the structure it protects.

Still another object is to make such a casing adaptable for use with pipes, conduits or other structures carrying or containing either hot or cold fluids, and one that will adhere even when expansion and contraction of the encased surface takes place.

A further object is to provide an economical and durable casing that may be readily installed by unskilled workers and one that can be utilized above or below ground.

Other objects will appear from the description which follows.

Heretofore, pipes and conduits have been coated with, or embedded in, various kinds and types of protective material. A number of materials used in the past have excelled in some protective features, but have been deficient in other respects. This invention accomplishes the sought for qualities of a good casing and barrier, namely, resistance to heat transfer and to breakage after placement; imperviousness to moisture, electric currents, deleterious soil chemicals, and insects.

This invention is illustrated in the accompanying drawing in which FIGURE 1 is a cross section taken through a trench in which a metal pipe lies encased in a protective casing made according to my invention; FIGURE 2 is a similar cross section showing a modified protective casing; and FIGURE 3 is a flow sheet showing the steps taken in preparing the casing of FIGURE 1.

Essentially, the casing herein described, consists of hollow beads ranging in size from one-quarter inch (¼") to a few microns in diameter, bonded together and to the structure it encases by a heat stable resin. The thickness of the casing wall will vary depending upon the insulating value desired and the size of the encased structure.

The hollow beads may be of glass, ceramic, clay or plastic, or any material that will withstand the temperatures to which it will be exposed, the hollow form being the physical asset that makes the resultant casing superior in the following properties:

Heat insulation
Less water absorption
Less loss of volume during compaction and shrinkage during consolidation The beads employed in any one mixture may be of uniform size or may be graded in size. A graded size will further decrease water absorption. A gradation of the following sieve analysis has been found very satisfactory:

| | Percent |
|---|---|
| Retained on No. 8 | 0.0 |
| Retained on No. 20 | 30.0 |
| Retained on No. 30 | 61.0 |
| Retained on No. 40 | 9.0 |

The heat stable resin is employed initially in granulated form, preferably in graded sizes sufficiently fine to minimize water penetration in a loose mass of granules. The asphaltics are recommended since they contribute the most desirable characteristics to the casing. When oil, oil products or other products deleterious to asphalts are present in the environment in which the casing is intended to function, then a coal tar or synthetic resin is recommended.

In the case of the resin, a graded rather than uniform size is preferred. A satisfactory gradation of resin granules is obtained with sieve analysis as follows:

| | Percent |
|---|---|
| Retained on No. 6 | 0.0 |
| Retained on No. 8 | 3.0 to 5.0 |
| Retained on No. 20 | 40.0 to 50 |
| Through No. 20 | 40.0 to 50 |

When the casing is to be used about a metal pipe or conduit capable of carrying a fluid heated above 200° F., the beads and the granulated resin are blended together in a suitable mixer in the proportions required to produce the predominate property desired in the casing. Thus, where maximum insulation is required, the beads should constitute about 85% by weight and the granulated resin about 15% by weight of the mixture placed in the mixer. Where greater water resistance is desired with an acceptable insulation value, the beads may be between 60 to 80% by weight and the granulated resin between 40 to 20% by weight.

After blending the mixture, it is poured around the pipe or conduit to be protected. Forms may be used for above or below ground installations, or for pipe or conduit lying in a trench, the trench bottom and walls may constitute the limiting surfaces for the casing. After the mixture is tamped in place, the pipe or conduit is heated to from 200° F. to 325° F., for from two to twenty-four hours to fuse the compacted mixture into a solid mass. FIGURE 1 shows metal pipe 1 in trench 2, surrounded by a fused layer 3 of hollow beads and asphalt resin, which in turn is surrounded by a compacted layer 4 of unfused hollow beads and asphalt resin, which results from taking the steps described and and as summarized in FIGURE 3. A lower softening point resin will require a lower temperature than one of higher softening point. To improve the bond between the casing and its embedded pipe or conduit, the outer surface of the latter may be primed with an application of a coat of asphalt, coal tar or synthetic resin, compatible with the binder material.

When the casing is used for pipe that will have a service temperature between 32° and 200° F., the use of a fluxing liquid rather than heat, for fusing the mixture into a solid mass is preferred. In such cases, a fluxing liquid is added to the beads and granulated resin before mixing, in quantity sufficient to fill all the voids between the particles. This may require as much as 20% by weight of the fluxing liquid. When used in such quantity, there will be negligible shrinkage resulting from compaction, pressure of backfill and amalgamation. Under certain circumstances, however, the use of as little as 5% by weight of fluxing liquid will produce a satisfactory degree of fusion.

After mixing, the material is put in place about the pipe and tamped.

An alternate method consists in placing pre-mixed beads and granulated resin in successive, horizontal layers in the trench or between the forms and thus encasing the pipe. Fluxing liquid is added to each layer by spraying. One inch thick layers may be used, since the flux will readily penetrate such thickness. Each layer will be tamped before adding the next. The resulting protective casing 5, surrounding pipe 1 in trench 2 is shown in FIGURE 2.

The fluxing liquid may be any one or a combination of a number of commercially available materials. For slow amalgamation, a petroleum distillate having an initial boiling point over 275° F. will be satisfactory. For rapid amalgamation, certain naphthalenic or aromatic compounds with a high Kauri butanol value will be satisfactory. The optimum is a combination of 20 to 50% by volume of a naphthalenic compound and 80 to 50% by volume of a petroleum distillate having a Kauri butanol value of 30 to 40 and an initial boiling point of 350° F.

A casing of the kind described may be pre-cast and then bonded to a pipe, by heating the pipe, or by use of an adhesive material, or by securing it by mechanical means.

It is obvious that various modifications may be made in the mixture herein described without departing from the scope of this invention, and I do not, therefore, limit myself to the illustrations given.

What I claim is:

1. A protective casing for a metal conduit comprising hollow beads, all passing a one-quarter inch screen, bonded together and to the metal conduit by a solidified resin, the beads comprising from 60% to 85% by weight of the mixture and the asphalt resin from 40% to 15% by weight.

2. The invention as set forth in claim 1, wherein the hollow beads are glass.

3. The invention as set forth in claim 1, wherein the hollow beads are ceramic.

4. The invention as set forth in claim 1, wherein the hollow beads are plastic.

5. A method of applying a protective casing to a metal conduit which consists in blending a mixture of from 60% to 85% by weight of hollow beads having a melting point in excess of 325° F. and passing a one-quarter inch screen and from 40% to 15% by weight of granulated asphalt resin; placing and compacting the mixture around the metal conduit, and transmitting heat from the conduit to the mixture at a temperature of from 200° F. to 325° F. for from two to twenty-four hours, thereby fusing the mixture into a solid mass.

6. The method as set forth in claim 5, wherein the hollow beads are of uniform size.

7. The method as set forth in claim 5, wherein the granules of asphalt resin all pass a No. 6 sieve and are graded in size.

8. The method as set forth in claim 5, wherein the hollow beads are graded so that all pass a No. 8 sieve and approximately the following sizes obtain:

| | Percent |
|---|---|
| Retained on No. 20 sieve | 30 |
| Retained on No. 30 sieve | 61 |
| Retained on No. 40 sieve | 9 | and the asphalt resin granules are graded so that the following sizes obtain:

| | Percent |
|---|---|
| Retained on No. 6 sieve | 0.0 |
| Retained on No. 8 sieve | 3 to 5 |
| Retained on No. 20 sieve | 40 to 50 |
| Through No. 20 sieve | 40 to 50 |

9. A method of applying a protective casing to a metal conduit which consists in blending a mixture of from 60% to 85% by weight of hollow beads passing a one-quarter inch screen, a fluxing liquid, and from 40% to 15% by weight of granulated asphalt resin and placing and compacting the mixture around the metal conduit.

10. A method of applying a protective casing to a metal conduit which consists in blending a mixture of from 60% to 85% by weight of hollow beads passing a one-quarter inch screen and from 40% to 15% by weight of granulated asphalt resin; placing and compacting the mixture around the metal conduit in layers about one inch thick; and spraying each layer with a fluxing liquid before adding the next layer.

References Cited in the file of this patent
UNITED STATES PATENTS

| 1,984,649 | McDonald et al. | Dec. 18, 1934 |
| 2,749,250 | Christensen et al. | June 5, 1956 |
| 2,774,383 | Kidd | Dec. 18, 1956 |
| 2,806,509 | Bozzacco et al. | Sept. 17, 1957 |
| 2,861,895 | Hardman | Nov. 25, 1958 |